US005539985A

United States Patent [19]
Wershe

[11] Patent Number: 5,539,985
[45] Date of Patent: Jul. 30, 1996

[54] BLOWER ATTACHMENT FOR A CIRCULAR SAW

[76] Inventor: Richard Wershe, 31958 Nardelli, Roseville, Mich. 48066

[21] Appl. No.: 342,860

[22] Filed: Nov. 21, 1994

[51] Int. Cl.$^6$ ....................................................... B25F 3/00
[52] U.S. Cl. ............................................. 30/123.3; 30/390
[58] Field of Search .................................. 30/123.3, 124, 30/390, 514, 516; 408/56, 57, 61

[56] References Cited

U.S. PATENT DOCUMENTS

| | | |
|---|---|---|
| 2,794,459 | 1/1955 | Hosford et al. . |
| 3,338,276 | 8/1967 | Reed ........................................ 30/123.3 |
| 4,664,165 | 5/1987 | Pollak et al. . |
| 5,046,255 | 9/1991 | Lebreux ................................... 30/390 |
| 5,074,044 | 12/1991 | Duncan et al. .......................... 30/124 |
| 5,084,971 | 2/1992 | Remington et al. ..................... 30/123 |
| 5,199,174 | 4/1993 | Wild ........................................ 30/123.3 |

*Primary Examiner*—Hwei-Siu Payer
*Attorney, Agent, or Firm*—Reising, Ethington, Barnard & Perry

[57] ABSTRACT

A circular saw (14) has blower attachments (10) and (12) for producing a sufficiently strong air current directly in front of the circular saw blade (18) to blow away saw dust from about the lead guide (34) that is aligned directly in front of the saw blade. The lead guide is mounted at the front edge of the foot (30). The attachment (10) is a fan mounted about the arbor of the circular saw and abuts the saw blade to also provide damping effect that reduces noise vibration. The attachment (12) has a funnel inlet section (60) mounted against the exhaust vent section (38). A self supporting flexible pipe (66) extends from the funnel inlet section and has a free standing distal end (67) that can be adjustably pointed to the lead guide (34) to allow passage of air flow from the exhaust vents to the lead guide.

10 Claims, 2 Drawing Sheets

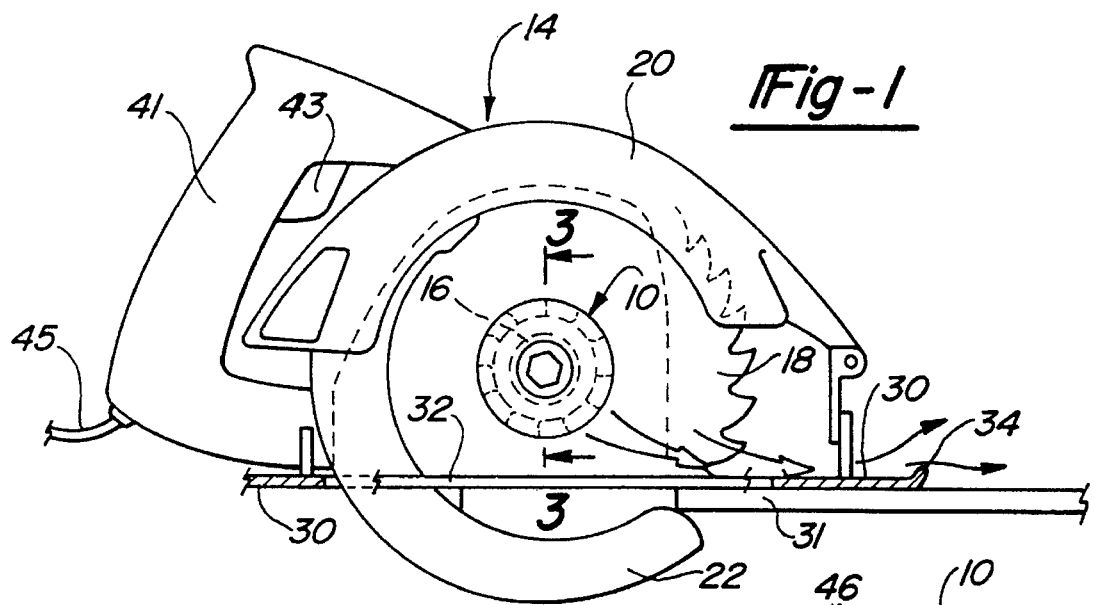

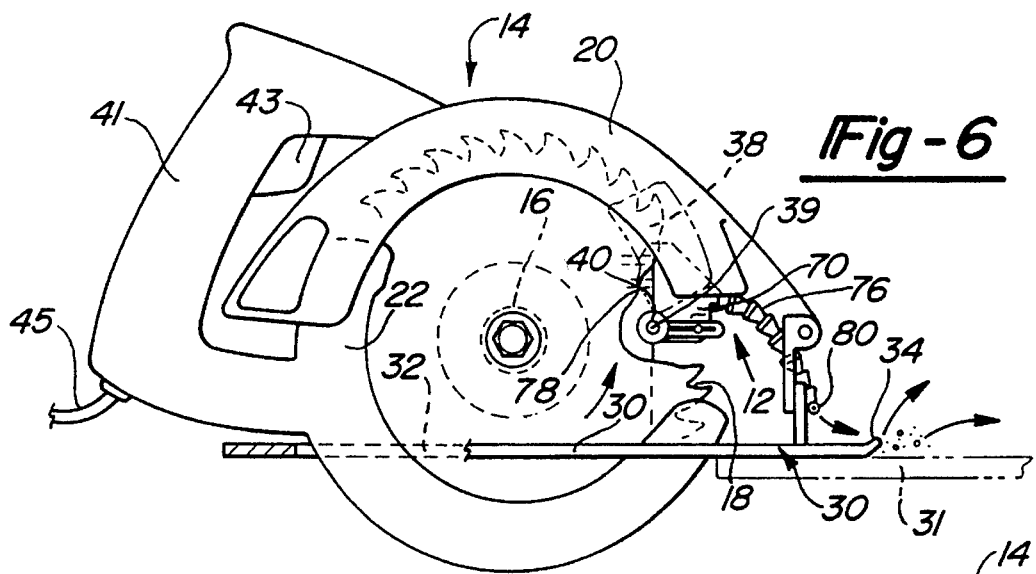
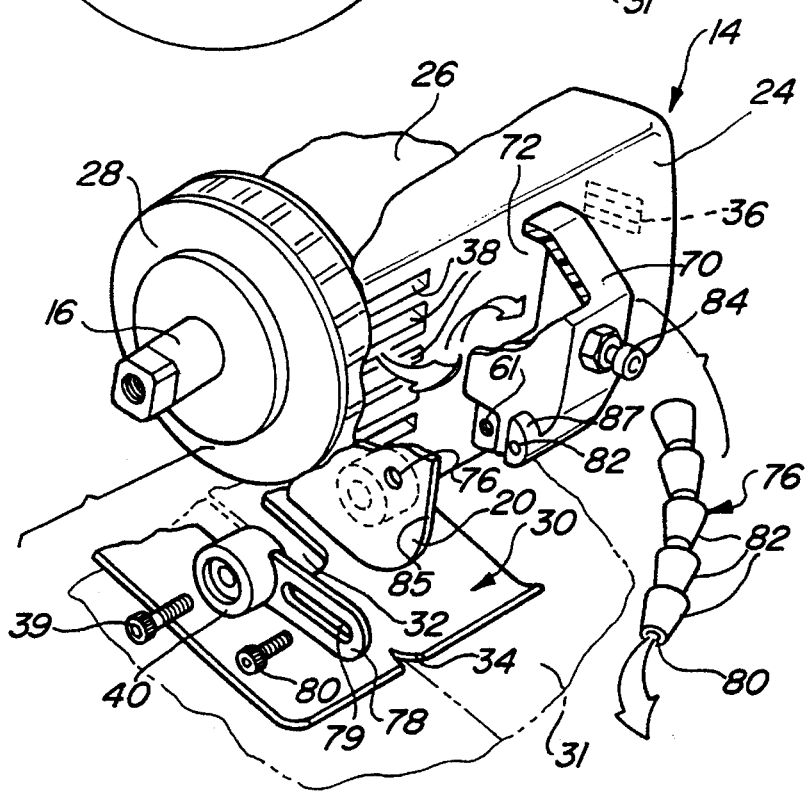
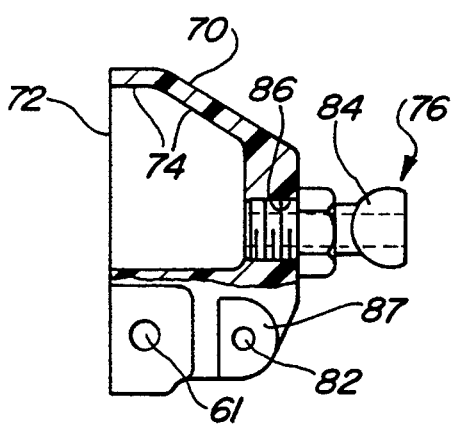
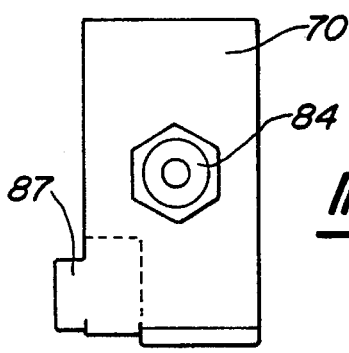

BLOWER ATTACHMENT FOR A CIRCULAR SAW

TECHNICAL FIELD

The field of this invention relates to power circular saws and more particularly to a blower attachment for a direct drive power circular saw that blows the saw dust away from the lead guide at the front portion of the saw foot.

BACKGROUND OF THE DISCLOSURE

Circular saws, particularly portable direct drive circular saws, have seen great commercial success because of their adaptability, reliability, power, convenience, and safety in cutting plywood, paneling or other flat surfaced woods.

Most direct drive circular saws have a blade guard housing and a pivotally mounted lower blade guard housing. The saw blade is mounted on an motor driven arbor. The motor is mounted within a motor housing adjacent the upper guard housing. The motor operably drives a cooling fan. A motor housing about the motor and fan has an inlet an exhaust vent for directing cooling air through the motor housing and about the motor. A foot having an opening therethrough is mounted about the circular saw blade for providing a platform on which the circular saw rests on the wood that is being cut.

The foot has a front lead guide for providing a visual alignment guide for indicating the linear alignment where the circular saw will cut into the wood. Many operators use this lead guide solely or in conjunction with the position of the saw blade to determine the alignment of the saw and properly guide the saw blade through the wood.

A common problem with circular saws is the fact that after a sufficient amount of saw dust is created by the cutting action of the saw blade, the saw dust often obscures the lead guide. An operator of the circular saw finds that he repeatedly either stops the saw to wipe away the saw dust or backs the saw off momentarily while he puckers his lips and manually blows the dust off. Either procedure wastes time and lowers the efficiency of the circular saw operation.

To date, circular saws have been developed and built without effective and economical blowers that clear most of the saw dust away from the aligned cutting path and maintain a visually clear path for the operator. The built-in systems use suction and mount a bag to collect the saw dust. The mount and bag add expense and while it collects much saw dust, it does not specifically address the problem of saw dust collecting upon and obscuring the lead guide.

The only known blowers use a complex flexible rubber conduit assembly that needs to be bracketed and clamped at its outlet end to maintain its appropriate position. See U.S. Pat. No. 5,084,971 to Remington et al. The rubber conduits and extra wire brackets make it inconvenient to use. Furthermore, many saws do not have threaded apertures about its exhaust vent that allows a plenum to be mounted thereto. As such, many people continue to blow the saw dust away with their breath.

What is needed is a economically feasible retrofit device that automatically and continuously blows the saw dust off the visual lead guide of a direct drive circular saw thereby eliminating the need for the operator to stop and clear the lead guide by wiping it or blowing air from his mouth. What is also needed is a blower device that can easily attach to a wide variety of present models as a retrofit accessory without the use of wire clamping devices or additional mounting screws embedded through the exhaust vent.

SUMMARY OF THE DISCLOSURE

In accordance with one aspect of the invention, a direct drive circular saw includes an upper blade guard housing and a lower blade guard housing pivotally mounted to said upper blade guard housing. A platform having an opening therethrough is mounted about the circular saw blade for providing a mount on which the circular saw rests itself onto the wood that is being cut. The platform has a lead guide in front of the blade guard housing for providing a visual alignment guide for indicating where the circular saw will cut the piece of wood.

The saw blade is mounted on a motor driven arbor. The motor is mounted within a motor housing adjacent the upper guard housing. The motor is operably mounted to a cooling fan that directs air in from an inlet, about the motor, and out through an exhaust vent in the motor housing. The vent is operably connected to duct work that directs air from the exhaust vent to the lead guide member for blowing saw dust away from said lead guide member when said motor is operating the saw blade through wood.

In one embodiment the duct work includes a self supporting flexible pipe that is adjustable and has a free standing distal outlet end that is adjustably pointed toward the lead guide member. Preferably, a mounting device mounts an inlet funnel section of the duct attachment to a bolt that passes through a hole in the upper blade guard housing that normally attaches a lower blade guard stop to the upper blade guard housing. The inlet funnel section operably leads to an outlet section having a free standing outlet that directs air from the vent and through the inlet section to the lead guide for blowing saw dust away from the lead guide when the circular saw is operating and cutting wood.

The outlet section desirably includes a flexible pipe that is adjustable in a plurality of fixed positions and has its free standing outlet adjustably pointed toward the lead guide member. The flexible pipe is free standing from its inlet end that is mounted to the inlet funnel section.

In one embodiment, the inlet funnel section is adjustably mounted to a lower blade guard stop. The lower blade guard stop has a protrusion extending forward therefrom with a slot therethrough. The inlet funnel section is adjustably mounted along the protrusion by a fastener extending through the slot and affixed to the inlet funnel section such that it properly abuts against the exhaust vent.

In another embodiment, a fan attachment is attached to the arbor through a single fastener of a power circular saw for continuously blowing saw dust away from a lead guide positioned in front of the saw blade. The fan attachment includes a center hub section for mounting onto an arbor that mounts the circular saw blade. The fan has a plurality of radially extending fan blades circumferentially spaced about the hub section. An inlet allow entry of air into the fan attachment to a radially inner portion of the fan blades. An annular rim section forms a wall in proximity to a respective one edge of the fan blades. The blades have a respective second edge that is abuttable against the circular saw blade that forms a wall for directing air flow. Air is drawn into the inlet and is directed radially outward from said inlet and out beyond said blades along the saw blade as the fan attachment rotates with said circular saw blade to provide a sufficiently strong air current directly in front of the saw blade to reach the lead guide that is aligned directly in front of the saw blade.

Desirably, the inlet is substantially annular in shape and positioned between the hub section and said rim section. The rim section is axially stepped from the hub section. The fan blades have their inner ends connected to a cylindrical wall of the hub section.

In accordance with a broader aspect of the invention, a blower attachment for directing a sufficiently strong air current in front of the circular saw blade is attached to the direct drive circular saw through a single mounting fastener. In accordance with another aspect of the invention, a guard stop of a circular saw includes a protrusion and mounting means therein for mounting duct work of a blower attachment for a circular saw.

BRIEF DESCRIPTION OF THE DRAWINGS

Reference now is made to the accompanying drawings in which:

FIG. 1 is a front elevational view of a direct drive power circular saw illustrating a first embodiment according of the invention;

FIG. 2 is fragmentary perspective and exploded view of the fan attachment shown in FIG. 1:

FIG. 3 is a cross sectional view taken along lines 3—3 shown in FIG. 1;

FIG. 4 is a another perspective view of the fan attachment shown in FIG. 2;

FIG. 5 is a modified fan for attachment against the saw blade;

FIG. 6 is partially fragmentary view similar to FIG. 1 illustrating a another embodiment according to the invention;

FIG. 7 is a fragmentary and exploded perspective view of the exhaust vent and blower attachment illustrated in FIG. 6;

FIG. 8 is a partially segmented and side elevational view of the inlet funnel member shown in FIG. 7; and FIG. 9 is a front elevational view of the inlet funnel member.

DETAILED DESCRIPTION OF THE PREFERRED EMBODIMENT

Referring now to FIG. 1, 6 and 7, blower attachments 10 and 12 are operably connected to a direct drive circular saw 14. The circular saw 14 includes standard arbor 16, a saw blade 18, an upper blade guard housing 20, a pivotally mounted lower blade guard 22 and a motor housing 24 mounted adjacent the upper blade housing that houses a motor 26 and cooling fan 28. The housing 24, motor 26 and fan 28 are shown more clearly in FIG. 7. The arbor 16 is operably connected to the motor 26 for rapid rotation during operation of the motor.

A saw foot 30 with an aperture 32 therethrough is adjustably mounted for height and angularity with respect to the upper blade housing. The aperture 32 allows the blade 18 and lower guard housing 22 to extend downward therefrom. The platform 30 provides for stable positioning of the circular saw on flat wood pieces 31 during the cutting process. The front end of the platform 30 includes a lead guide 34 that can be a notch, colored line, etched surface or other suitable indicia.

The motor housing 24 includes inlet vents 36 and front exhaust vent section 38 adjacent the upper blade housing. The pivoting lower blade guard 22 is abuttable against a stop member 40 that is affixed via bolt 39 to the upper blade housing 20. A handle 41 is affixedly mounted to the motor housing 24 and has a power switch 43 incorporated therein and a power cord 45 extending therefrom. The above described features apart from the blower attachments are common and standard features of many direct drive circular saws and their specific structure will not be discussed further apart from how they interact with the blower attachments 10 and 12.

Blower attachment 10 as shown in more detail in FIGS. 2–4 has a center hub section 42 with a center aperture 44 that allows the blower attachment 10 to be mounted onto arbor 16 via a washer 47 and fastener 49. A plurality of radially extending blades 46 are circumferentially spaced about the hub section 42. Each blade 46 has its inner edge 47 connected to a cylindrical wall 48 of the hub section 42. An annular rim 50 is mounted to the outer side edge 52 of each blade 46. The rim 50 is axially spaced from the center hub wall 54 of hub section 42 to form a substantially annular inlet 53. The center hub wall 54 and cylindrical wall 48 form a cavity 56 sized to receive the washer 47 that fits about the arbor 16.

The edge 58 of the cylindrical wall 48 and inner side edge 60 of the fan blades are coplanar and abut the saw blade 18 when properly mounted onto the arbor 16. The bolt head 61 and washer 63 retain the blower 10 in place against the saw blade.

The fan blades 46 are curved such that upon rotation of the circular saw blade by the motor, the fan blades 46 cause air flow from the inlet 53 to the radially outer periphery 62 of the fan blades 46 and beyond. The formed air flow is strong enough to extend in front of the saw blade 18 and to the lead guide 34 to continuously blow saw dust away from the lead guide during operation of the circular saw.

The abutment of the fan attachment against the saw blade also provides for damping of any vibration noise, i.e. hum, of the saw blade to provide for quieter operation.

A modified fan 110 is shown in FIG. 5. This fan 110 has a center hub section 142 and a circular periphery 145 with a plurality of fan blades 146 circumferentially spaced on the periphery 145. Each blade 146 is formed by stamping from periphery 145 and is directed inwardly and constructed to direct air radially outwardly through the simultaneously formed apertures 153. Air is resupplied from center inlet 153. The periphery 145 has an edge 158 that abuts the saw blade 18. As with the first blower attachment 10, the fan 110 also has overall diameter substantially smaller than the circular saw blade 18.

The second blower attachment 12 can be used alternatively or in addition to the blower attachment 10. The attachment 12 is shown in more detail in FIGS. 6–9. The blower attachment 12 includes an inlet funnel section 70 having an inlet end 72 adapted to abut against the exhaust vent section 38 in the motor housing 24. The interior surfaces 74 funnel the air from the exhaust vent section 38 through an outlet 86 and into a flexible pipe section 76. The pipe section 76 may be a plurality of rigid links 82 pivoted together as in the commercially available Lock-Tite piping. The upstream link 84 is rigidly affixed to the outlet 86 of the funnel 70. The downstream end 81 of the pipe section 76 is open to form an outlet 80.

The flexible piping 76 is adjustable to bend under manual operation and bending by the operator but is stable once placed into position against the air flow pressures exiting the funnel section 70 and is also resistant to normal jostling and vibrations encountered by the circular saw such that the end 81 is free standing without the support of clamps or brackets attached thereto or in proximity therewith. The outlet 80 is aimed toward the lead guide 34 as illustrated in FIG. 5 to continuously blow the saw dust from the lead guide and allow the lead guide to remain continuously visible during operation of the circular saw.

For mounting to a wide variety of different circular saw models, a guard stop 40, as shown in FIG. 7 may be bolted to the guard housing through a center aperture 77 in upper guard housing. The stop 40 has an integrally formed slotted protrusion 78 that extends forward therefrom forward of the front edge of the guard housing 20. A slot 79 receives a threaded bolt 83. The funnel section has a front protrusion 87 that spans over the front edge 85 of the upper guard 20 and abuts against the side of the protrusion 78 and has a threaded hole 89 that threadably engages the bolt 80. The slot 79 allows the inlet funnel section to be axially adjusted such that the inlet end 72 of funnel 70 may appropriately abut the vent section 38 of the various different circular saw models.

For certain models of circular saws, the inlet funnel section 70 has another threaded mounting hole 61 positioned with respect to the inlet end 72 such that the hole 61 is aligned with the hole 77 in upper blade guard housing. The threaded mounting hole 61 threadably receives bolt 39 that also mounts the guard stop 40 to affix it in place against exhaust vents 38.

Variations and modifications are possible without departing from the scope and spirit of the present invention as defined by the appended claims.

The embodiments in which an exclusive property or privilege is claimed are defined as follows:

1. In a circular saw power tool having a housing and a pivotally mounted lower blade guard, a lead guide mounted in a front portion of a saw foot for resting on a piece of wood; a hub mounting adapted to mount a circular saw blade, a motor rotatably driving said hub mounting, a motor housing mounted about said motor, a cooling fan mounted to said motor within said motor housing for directing air about said motor and out through an exhaust vent in said motor housing; the improvement characterized by:

a lower blade guard stop mounted to said housing and having a forwardly extending protrusion with a longitudinally extending slot therein for mounting a means for producing a sufficiently strong air current directly in front of the circular saw blade of the circular saw to blow away saw dust from about the lead guide that is aligned directly in front of the saw blade.

2. A fan attachment for a circular saw power tool for blowing saw dust away from contact area between a saw blade and a piece of wood and from a lead guide positioned in front of said saw blade; said fan attachment characterized by:

a center hub section for mounting onto a hub of said power circular saw that mounts a circular saw blade;

a plurality of radially extending fan blades circumferentially spaced about said hub section;

an inlet for allowing entry of air therein to a radially inner portion of said fan blades;

an annular rim section forming a wall in proximity to a respective one side edge of said fan blades;

said fan blades having a second side edge that is abuttable against said circular saw blade such that air is directed radially outward from said inlet out beyond outer edges of said fan blades as said fan attachment rotates with said circular saw blade.

3. A fan attachment as defined in claim 2 further characterized by:

said inlet being substantially annular in shape and positioned between said hub section and said rim section;

said rim section being axially stepped from said hub section.

4. A fan attachment as defined in claim 3 further characterized by:

the fan blades having their inner ends connected to a cylindrical wall section of said hub section.

5. In a circular saw power tool having a blade protective housing, a lead guide mounted in front of said blade protective housing for resting on a piece of wood; a hub mounting adapted to mount a circular saw blade, a motor rotatably driving said hub mounting, a motor housing mounted about said motor, a cooling fan mounted to said motor within said motor housing for directing air about said motor and out through a vent in said motor housing; the improvement characterized by:

said vent including self supporting duct work that has a free standing distal end that directs air from the vent to the lead guide for blowing saw dust away from said lead guide when said motor is on and rotating said saw blade; and a mounting device for mounting said duct work that leads from said vent to a bolt that extends through and engages an aperture in said blade protective housing.

6. A circular saw power tool as defined in claim 5 further characterized by:

said duct work being constructed to be a self supportive flexible pipe that is adjustable and having a free standing distal outlet pointed toward said lead guide.

7. A duct attachment for a circular saw power tool, said circular saw power tool having an upper blade guard housing and a pivotable lower blade guard housing, a lead guide mounted in front of said upper blade guard housing for resting on a piece of wood; an arbor adapted to mount a circular saw blade, a motor rotatably driving said arbor; a motor housing mounted about said motor, a cooling fan mounted to said motor within said motor housing for directing air about said motor and out through a vent in said motor housing; said duct attachment characterized by:

a mounting device for mounting an inlet section of said duct attachment to a bolt that passes through a hole in said upper blade guard housing that attaches a lower blade guard stop to said upper blade guard housing; and said inlet section leading to an outlet section having an outlet that directs air from the vent to the lead guide for blowing saw dust away from said lead guide when said motor is on and rotating said saw blade.

8. A duct attachment as defined in claim 7 further characterized by:

said outlet section being constructed to be a self supportive flexible pipe that is adjustable and having a distal free standing outlet adjustably pointed toward said lead guide.

9. A duct attachment as defined in claim 6 further characterized by:

said mounting device includes said lower blade guard stop having a protrusion extending forward therefrom with a slot therethrough, said protrusion adjustably mounts said inlet section axially along said slot.

10. In a circular saw power tool having a housing and a pivotally mounted lower blade guard, a lead guide mounted in a front portion of a saw foot for resting on a piece of wood, a hub mounting;

a circular saw blade removably mounted on said hub mounting;

a motor rotatably driving said hub mounting; a motor housing mounted about said motor, a cooling fan mounted to said motor within said motor housing for directing air about said motor and out through an exhaust vent in said motor housing;

the improvement characterized by:

a blower fan removably mounted on said hub mounting externally of said housing;

said blower fan abutting against said saw blade and having a diameter substantially smaller than the diameter of said saw blade;

an annular rim connected to said blower fan and spaced from said saw blade;

a plurality of fan blades interposed between said saw blade and said annular rim for directing an air stream forward of said circular saw blade to said lead guide.

* * * * *